United States Patent [19]

Fromont et al.

[11] Patent Number: 5,250,664
[45] Date of Patent: Oct. 5, 1993

[54] PROCESS FOR TANNING PROTEIN SUBSTANCES, IN PARTICULAR VEGETABLE PROTEIN SUBSTANCES SUCH AS THE PROTEINS OF OIL SEEDS AND TANNED PROTEIN SUBSTANCES OBTAINED USING THIS PROCESS

[75] Inventors: Jacques P. Fromont, Lesigny; Claude Portilla, Bayonne, both of France

[73] Assignee: Societe Nationale De Commercialisation Des Oleagineux Du Senegal, Dakar, Senegal

[21] Appl. No.: 778,448

[22] Filed: Oct. 16, 1991

[30] Foreign Application Priority Data

Oct. 19, 1990 [FR] France ............................ 90 12979

[51] Int. Cl.⁵ ............................ K23J 3/00; A23K 1/18
[52] U.S. Cl. .................................... 530/377; 530/370; 530/371; 530/378

[58] Field of Search ............... 530/370, 371, 377, 378; 514/396, 397

[56] References Cited

U.S. PATENT DOCUMENTS

| | | | |
|---|---|---|---|
| 4,105,762 | 8/1978 | Miller et al. | 514/396 |
| 4,115,578 | 9/1978 | Miller et al. | 514/396 |
| 4,118,461 | 10/1978 | Miller et al. | 514/397 |
| 4,237,158 | 12/1980 | Miller et al. | 514/396 |

Primary Examiner—Howard E. Schain
Assistant Examiner—P. Lynn Touzeau
Attorney, Agent, or Firm—Zarley, McKee, Thomte, Voorhees & Sease

[57] ABSTRACT

Process for tanning a protein substance, in particular one of vegetable origin, such as oil seed proteins, characterized in that it includes treating the said protein substance with a dithiocarbamate type compound, partially degraded by a strong acid.

12 Claims, No Drawings

PROCESS FOR TANNING PROTEIN SUBSTANCES, IN PARTICULAR VEGETABLE PROTEIN SUBSTANCES SUCH AS THE PROTEINS OF OIL SEEDS AND TANNED PROTEIN SUBSTANCES OBTAINED USING THIS PROCESS

The present invention relates to a process for tanning protein substances, in particular vegetable protein substances such as oil seed proteins.

Most protein substances are known to be liable to undergo total or partial degradation (deamination) into ammonia through the action of the digestive flora. Such degradation, which is more particularly observed in polygastric animals, such as ruminants, is prejudicial to the nutritive value of the said substances.

Attempts had already been made in the past to remedy this state of affairs by protecting the protein substances in question from the deaminating action of the digestive flora of the being that consumes them. For this purpose, it has been proposed to subject these substances to the action of a tanning agent, formol, which has the property of blocking completely or partially the amino groups liable to undergo bacterial deamination.

However, as formol is carcinogenic, its use will be subject to increasingly strict controls in the farm-produce industry and, in certain cases, its use is henceforth prohibited, in particular in the USA and in Switzerland.

Under these circumstances, the Applicant conducted a certain number of studies with a view to developing a substitute product for formol the use of which would not meet any objections on the part of hygienists and toxicologists. He has thus discovered that compounds of the dithiocarbamate type prove to have a protein tanning action that is of particular interest, as will be explained hereinafter.

The present invention thus relates to a process of the type specified in the first paragraph of this description, which is characterized in that it comprises the treatment of the protein substances with a compound of the dithiocarbamate type, partially degraded by a strong acid, for example a mineral acid such as hydrochloric acid, this compound preferably being of the following formula:

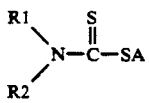

wherein A=H or metal (for example, an alkaline metal such as sodium) and R1 and R2 each represent, independently of one another, H, C1-C4 alkyl or C3-C7 cycloalkyl.

It will be noted firstly that the compound implemented according to the invention belongs to a chemical class that has no connection with that of formol.

Moreover, it was observed that the tanning treatment according to the invention brought into play a sulphur vulcanization process by contrast with the tanning treatment using formol, which brings into play methylation reactions; the mode of action of dithiocarbamates is thus quite original with respect to that of formol.

Furthermore, such tanning by vulcanization causes the proteins to be transformed into complexes that are insoluble in water and which, while they are not sensitive to deaminating bacterial action, can nonetheless be dissociated by the proteolytic enzymes that are secreted by the digestive organs, so that there is better use of nitrogen and, consequently, a definite improvement in the nutritive properties of the proteins.

It should also be stressed that, while the rates of reduction in protein degradation, obtained using the treatment according to the invention, are close to those obtained using the formol tanning treatment, the doses of dithiocarbamate type compound needed to obtain this result are, however, lower than the doses of formol. Thus, when a dimethyldithiocarbamate such as sodium dimethyldithiocarbamate is used, the doses are ten times smaller than those of formol, which is quite substantial.

It should be added that this dithiocarbamate is a product approved by the Food and Drug Administration in the USA and by the Public Health Ministry in France, and that it meets the standards of the Conseil Supérieur de l'Hygiène Publique (Board of Public Hyggiene) in Switzerland. In addition, it does not have an adverse effect on the digestive microflora of the being that ingests it or on the health of the latter.

Although the vulcanization mechanism has not yet been clearly established, the hypothesis is that, under the effect of the strong acid and the reaction conditions, decomposition of the dithiocarbamate takes place, with the formation of colloidal sulphur and CS2, the latter reacting with the amino groups of the proteins to give rise to sulphur containing entities catalyzing the Vulcanization by sulphur.

The quantity of dithiocarbamate to be used according to the invention can be within a range of 0.01% to 5% of the weight of the total nitrogen materials of the protein substance to be treated. It is to be noted that the weight of the total nitrogen materials is given by the expression "% N2×6.25", where "% N2" represents the total nitrogen percentage of the protein substance, determined by the well-known Kjeldahl titration method.

Furthermore, dithiocarbamate can be used conveniently in the form of a suspension or an aqueous solution, and use can be made, notably, of "SONAPAC 78" marketed by the ERPAC company and which is a 35% (w/v) aqueous solution of a mixture of sodium dimethyldithiocarbamate and dimethyltetrahydrothiadiazine (a bactericide).

As to the strong acid, it is preferably added to the suspension or solution of dithiocarbamate just before the latter is used, the quantity of this acid representing preferably 4 to 10% by weight of the dithiocarbamate.

The tanning treatment will be carried out advantageously in a medium containing solely water as a solvent or diluent. The quantity of water to use depends, in particular, on the nature of the protein substance to be treated, the desired degree of vulcanization and the treatment temperature; it can, in particular be in a range of 10 to 300% by weight of the protein substance, and it will preferably be all the higher the lower the treatment temperature.

The vulcanization tanning process according to the invention is applicable, in particular, to protein materials of vegetable origin, for example those suitable for animal foods such as oilcakes of oleaginous seeds such as soya, colza and groundnut, or cereal grains and flours.

It should be pointed out here that oil seed cakes are naturally contaminated by a micro-fungus known as

*Aspergillus Flavus*, which causes the formation, in these cakes, of a mycotoxin called aflatoxin, considered to be a poison and carcinogen.

This being the case, it is customary to subject these cakes to detoxication for the purpose of destructing the aflatoxin and the strains of *Aspergillus Flavus*, this detoxication consisting in treatment using a base, usually ammonia.

It was found, however, in the course of this treatment, that there was a substantial increase in the proportion of soluble proteins, which has the disadvantage of considerably increasing the degradation (deamination) into ammonia of the proteins under the effect of the digestive flora of the being that ingests the latter. Since the treatment according to the invention permits, as already indicated, a substantial reduction in the percentage of soluble proteins, it is also recommended for detoxicated oil seed cakes.

According to one possible, non-limitative form of embodiment, the process according to the invention can be implemented as follows.

The protein substance is reduced by crushing to a finely ground state with a grain size of preferably less than 2 mm.

To the resulting substance, there is then added, at ambient temperature, a suspension or aqueous solution of dithiocarbamate, this operation being carried out, for example, in a mixer-homogenizer. The mixture thus obtained is then placed in a reactor, where its temperature is brought to 20°-115° C. by indirect heating and the injection of steam; the reactor can take the form, in particular, of a low-speed rotary reactor, possibly equipped with fast auxiliary homogenizers. It is to be noted that, at a temperature of 20° C., the quantity of water used will represent advantageously 200 to 300% by weight of the protein substance and that, at a temperature of 115° C., it will advantageously be 10 to 45% by weight of the protein substance.

The pressure in the reactor can be fixed at between 1.10-5 and 10.10-5 Pa and the reaction time will vary between 10 minutes and 15 hours. This time can be short when operating at high temperature and pressure and long when operating at low temperature and pressure. The tanned substance is next pelletized in conventional presses and then cooled, and its moisture content is re-adjusted before storage. The following examples are given to provide a non limitative illustration of the invention.

EXAMPLE 1

A groundnut oilcake (with a 4% constitutional moisture content) was added with 8.5% by weight of water and 0.089% by weight of SONAPAC 78. The resulting mixture was raised to 100° C. for 15 minutes. This resulted in a reduction in the soluble nitrogen content of the oilcake from 45% to 29%, such a result being achievable with formol only by using a dose that is substantially 10 times greater, i.e. 0.82% by weight of a 30% (w/v) formol solution.

Furthermore, the theoretical degradability of this treated oilcake, measured 'in saccol' in the course of tests carried out on fistulized animals (cows) represented approximately 70% as opposed to approximately 83% in the case of the untreated oilcake.

EXAMPLE 2

The same groundnut oilcake as in example 1 was added with 9% by weight of water and then treated with 0.15% by weight of SONAPAC 78 at 100° C. for 20 minutes. The soluble nitrogen content of the oilcake dropped from 45% to 19%, theoretical degradability being reduced to 50%, as opposed to 83% in the case of the control sample.

EXAMPLE 3

The soluble nitrogen content of a cottonseed oilcake to which 9.5% by weight of water was added and which was treated with 0.21% by weight of SONAPAC 78 at 100° C. for 30 minutes dropped from 46% to 12%

We claim:

1. A process for processing protein substance from the deaminating action of the digestive flora, said process comprising;
   obtaining a protein substance susceptible to the deaminating action of the digestive flora; and
   preparing a solution of a strong acid partially degraded dithiocarbamate; and
   treating the protein substance with said partially degraded dithiocarbamate.

2. Process according to claim 1, characterized in that the dithiocarbamate type compound has the formula:

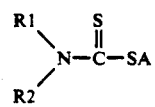

wherein A=H or alkaline metal, and R1 and R2 represent, independently of one another, H, C1-C4 alkyl or C3-C7 cycloalkyl.

3. Process according to claim 2, characterized in that A represents sodium.

4. Process according to claim 1, characterized in that the compound is sodium dimetliylditiocarbamate.

5. Process according to claim 1, characterized in that the strong acid is hydrochloric acid.

6. Process according to claim 1, characterized in that the quantity of dithiocarbamate type compound used represents 0.01 to 5% weight of total nitrogen materials of the protein substance.

7. Process according to claim 1, characterized in that the quantity of strong acid is 4 to 10% by weight of the dithiocarbamate type compound.

8. Process according to claim 1, characterized in that the protein substance is chosen from the group including oilcakes of oleaginous seeds, cereal grains, cereal flours and their mixture.

9. Process according to claim 1, characterized in that the protein substance is constituted by an oilcake of oleaginous seeds detoxicated by treatment with a base.

10. The produced of the process according to claim 1.

11. A process according to claim 1, whereas the proteins are of vegetable origin.

12. A process according to claim 11, whereas the proteins are of oil seed proteins.

* * * * *

UNITED STATES PATENT AND TRADEMARK OFFICE
CERTIFICATE OF CORRECTION

PATENT NO. : 5,250,664

DATED : October 5, 1993

INVENTOR(S) : Jacques P. Fromont and Claude P. Bayonne

It is certified that error appears in the above-indentified patent and that said Letters Patent is hereby corrected as shown below:

Column 4,

Claim 1, line 1, for "processing" substitute "protecting".

Column 4,

Claim 4, line 2, for "dimetliylditiocarbamate" substitute "dimethyldithiocarbamate".

Column 4,

Claim 10, for "The produced" substitute "The product".

Signed and Sealed this

Eighteenth Day of October, 1994

Attest:

BRUCE LEHMAN

Attesting Officer          Commissioner of Patents and Trademarks